(12) United States Patent
Yoshida et al.

(10) Patent No.: US 9,358,950 B2
(45) Date of Patent: Jun. 7, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takashi Yoshida, Aichi-ken (JP); Akira Sumiyashiki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 266 days.

(21) Appl. No.: 13/933,161

(22) Filed: Jul. 2, 2013

(65) Prior Publication Data

US 2014/0008479 A1  Jan. 9, 2014

(30) Foreign Application Priority Data

Jul. 4, 2012  (JP) .................................. 2012-150904

(51) Int. Cl.
*B60R 22/40*  (2006.01)
*B60R 22/36*  (2006.01)

(52) U.S. Cl.
CPC ................ *B60R 22/36* (2013.01); *B60R 22/40* (2013.01); *B60R 2022/402* (2013.01)

(58) Field of Classification Search
CPC ...................................................... B60R 22/40
USPC .............. 242/383.2–383.3, 384, 384.2–384.6
See application file for complete search history.

(56) References Cited

U.S. PATENT DOCUMENTS

| | | | | |
|---|---|---|---|---|
| 4,050,644 A | * | 9/1977 | Fohl ............................ | 242/384.4 |
| 4,314,680 A | * | 2/1982 | Takada .......................... | 242/384 |
| 4,453,681 A | * | 6/1984 | Gueguen et al. .............. | 242/376 |
| 4,619,417 A | * | 10/1986 | Teraoka et al. ............ | 242/384.6 |
| 5,251,843 A | * | 10/1993 | Kielwein et al. ........... | 242/384.6 |
| 5,568,941 A | * | 10/1996 | Woydick et al. .............. | 280/806 |
| 5,848,758 A | * | 12/1998 | Ernst ........................... | 242/384.4 |
| 6,957,790 B2 | * | 10/2005 | Kielwein et al. ........... | 242/384.6 |
| 2009/0033084 A1 | * | 2/2009 | Sorensen et al. ............. | 280/806 |

(Continued)

FOREIGN PATENT DOCUMENTS

| | | |
|---|---|---|
| GB | 2138139 | 10/1984 |
| JP | 10157569 A | 6/1998 |

OTHER PUBLICATIONS

Extended European Search Report dated Sep. 25, 2013 EP Application No. 13174826.1-1503.

(Continued)

*Primary Examiner* — Emmanuel M Marcelo
*Assistant Examiner* — Justin Stefanon
(74) *Attorney, Agent, or Firm* — Roberts Mlotkowski Safran & Cole, PC

(57) ABSTRACT

In a placement face of which a general face is configured with a circular cone shape, restriction faces are formed. When a sensor ball rolls along an axial direction of rotating shafts, the sensor ball accordingly contacts one of the restriction faces or another of the restriction faces. From this state, in order for the sensor ball to roll further along the axial direction of the rotating shafts, the sensor ball has to rise up the one of the restriction faces or the other of the restriction faces that respectively have a larger angle of incline than the general face. By contrast, in order for the sensor ball to roll in directions orthogonal to the axial direction of the rotating shafts as seen in plan view, the sensor ball only has to roll over the general face.

4 Claims, 5 Drawing Sheets

(56) References Cited

U.S. PATENT DOCUMENTS

| | | | |
|---|---|---|---|
| 2010/0193622 A1* | 8/2010 | Ono | 242/384 |
| 2011/0240787 A1* | 10/2011 | Lee | 242/384.6 |
| 2014/0158807 A1* | 6/2014 | Wanwambeke et al. | 242/384.5 |

OTHER PUBLICATIONS

European Office Action issued in EP Application No. 13174826.1-1503 dated Mar. 13, 2015.

* cited by examiner

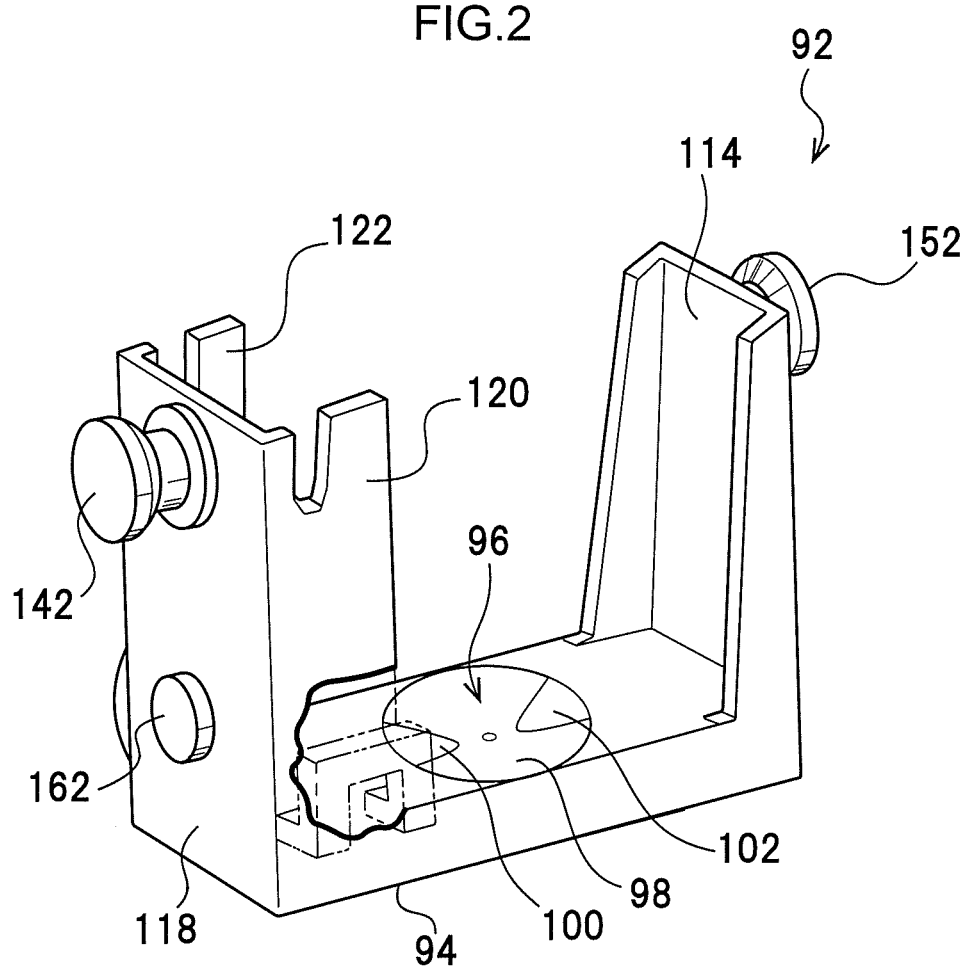

WEBBING TAKE-UP DEVICE

CROSS-REFERENCE TO RELATED APPLICATION

This application claims priority under 35 USC 119 from Japanese Patent Application No. 2012-150904 filed Jul. 4, 2012, the disclosure of which is incorporated by reference herein.

BACKGROUND OF THE INVENTION

1. Field of the Invention

The present invention relates to a webbing take-up device configuring a vehicle seat belt apparatus, and in particular relates to a webbing take-up device suited to installing in a seat back of a vehicle mounted seat with reclining mechanism.

2. Related Art

In a webbing take-up device disclosed in Japanese Patent Application Laid-Open (JP-A) No. 10-157569, an inertia mass body (referred to as a sensor ball in JP-A No. 10-157569) is placed on a bracket of an acceleration detection means (referred to as an acceleration sensor in JP-A No. 10-157569). The bracket is attached to a hanger so as to be capable of rotatable about an axis whose axial direction is as the same direction of the axial direction of a spool. When a retractor base is tilted about an axis whose axial direction is as the same axial direction of the spool axial direction, the bracket accordingly rotates relative to the retractor base, as the bracket attempts to maintain the same attitude as in a state prior to the retractor base rotating.

The bracket is configured so as to be capable of rotating with respect to the retractor base such as described above. Accordingly, the angle of incline of the face on which the inertia mass body is placed is made small such that the inertia mass body rolls in the event of the bracket rotating at a time of sudden vehicle deceleration. However, the bracket does not rotate in the axial direction of rotation thereof (mainly in the vehicle left-right direction). The inertia mass body accordingly readily rolls in the axial direction of rotation of the bracket, resulting in a difference in rolling sensitivities of the inertia mass body between in the rotation axial direction and in the direction orthogonal to the rotation axial direction (mainly in the vehicle front-rear direction).

SUMMARY OF THE INVENTION

In consideration of the above circumstances, the present invention is to obtain a webbing take-up device capable of reducing the difference in rolling sensitivities of an inertia mass body between in an axial direction of rotation of an acceleration sensor with respect to a device main body and in a direction orthogonal to the axial direction of rotation.

A webbing take-up device according to a first aspect of the present invention includes: a device main body comprising a spool, the spool taking up a webbing from a base end side thereof in a webbing length direction onto an outer peripheral portion of the spool by rotating in a take-up direction that is one direction about a center axis of the spool; an acceleration detection section that is provided at the device main body so as to be capable of rotating with respect to the device main body about an axis whose axial direction is a specific direction such that, accompanying tilting of the device main body, the acceleration detection section maintains the same orientation as orientation of the acceleration detection section in a state prior to the device main body tilting, a placement face, formed in a concave shape that is open upwards, being formed at the acceleration detection section, a spherical shaped inertia mass body being placed on the placement face, the inertia mass body rolling on the placement face due to inertia at a time of a sudden vehicle deceleration, the placement face being configured to include a general face and a restriction face, the general face being a shape that an inner peripheral profile is open upwards, the restriction face being formed on at least one side further than a center of the placement face in a vehicle left-right direction as seen in plan view from an open direction side of the placement face, an angle of incline, with respect to a horizontal direction, of the restriction face being larger than an angle of incline, with respect to the horizontal direction, of the general face, such that rolling of the inertia mass body on the placement face in the vehicle left-right direction is restricted to a greater extent than rolling of the inertia mass body on the placement face in a vehicle front-rear direction; and a lock section that is actuated by the spool rotating in a pull-out direction that is the opposite direction from the take-up direction in a state in which the inertia mass body of the acceleration detection section rolls on the placement face, rotation of the spool in the pull-out direction being restricted by actuation of the lock section.

In the webbing take-up device of the first aspect, the inertia mass body of the acceleration detection section moves across on the placement face under inertia at a time of a sudden vehicle deceleration in a state in which the webbing has been pulled out from the spool of the device main body and is being worn by an occupant. In this state, when the body of the occupant, attempting to move under inertia towards the vehicle front, pulls the webbing and rotates the spool in the pull-out direction, the lock section is actuated and rotation of the spool in the pull-out direction is restricted. The webbing is accordingly restricted from being pulled out from the spool, the webbing effectively restraining the body of the occupant that is attempting to move towards the vehicle front under inertia.

In the present webbing take-up device, when the device main body tilts accompanying tilting (reclining) of the vehicle seat back, the acceleration detection section rotates with respect to the device main body about a shaft portion of the acceleration detection section such that it attempts to maintain its attitude prior to tilting of the device main body. There is accordingly no change to the attitude of the acceleration detection section, or any such change in attitude is small, even when the device main body tilts as described above. The acceleration detection section can accordingly be made to function similarly to prior to tilting, even when the device main body has tilted.

Note that the inner peripheral profile of the general face of the placement face is configured in a shape that is open upwards. When vehicle acceleration (deceleration) exceeds a specific amount during deceleration of the vehicle, the inertia mass body accordingly rises up as it rolls and moves across an inclined face of the general face. A lock mechanism is actuated when the spool rotates in the pull-out direction in this state.

The restriction face(s) is formed at the placement face at least one vehicle left-right direction side with respect to the center of the placement face as seen in the plan view. The angle of incline of the restriction face(s) with respect to the horizontal direction is larger than the angle of incline of the general face with respect to the horizontal direction. The inertia mass body is accordingly suppressed from rolling towards the restriction face side(s) since the inertia mass body has to rise up the restriction face(s) with a larger angle of incline than the general face in order to roll up to the restriction face side(s).

The inertia mass body accordingly rolls less readily in the vehicle left-right direction than in the vehicle front-rear direction. In other words, the sensitivity (ease of rolling) of the inertia mass body in event of a sudden vehicle deceleration is greater (the inertia mass body rolls more readily) in the vehicle front-rear direction than in the vehicle left-right direction. Accordingly, in event of a sudden vehicle deceleration, in a case in which the acceleration detection section has rotated about the axis whose axial direction is in the vehicle left-right direction (in this case, the inertia mass body rolls less readily in the vehicle front-rear direction, on the other hand, rolls readily in the vehicle left-right direction), the sensitivity of the inertia mass body in the vehicle front-rear direction can be made substantially the same as the sensitivity of the inertia mass body in the vehicle left-right direction, this being different to the direction of rotating of the acceleration detection section.

A webbing take-up device according to a second aspect of the present invention is the first aspect of the present invention wherein: the restriction faces are formed on both sides further than the center of the placement face in the vehicle left-right direction as seen in the plan view; the restriction faces are configured as faces that are inclined towards the center side of the placement face as seen in the plan view from the open side of the placement face; and the restriction faces are set such that, in a state in which the inertia mass body is placed at the center of the placement face as seen in the plan view, the inertia mass body contacts the general face at a lower side than the restriction faces.

In the webbing take-up device of the second aspect, the restriction faces are formed on both the plan view left and right sides with respect to the center of the placement face. Here, the restriction faces are configured as faces that are inclined towards the center side of the placement face as seen in the plan view from the open side of the placement face, and the restriction faces are set such that, in a state in which the inertia mass body is placed at the center of the placement face as seen in the plan view, the inertia mass body contacts the general face at a lower side than the restriction faces.

In the aspects, the general face has preferably a circular cone shape. Here, since the general face has a circular cone shape, the contact portion between the spherical shaped inertia mass body and the general face is a circular ring shape. Unintended movement of the inertia mass body can accordingly be suppressed.

In the above aspects, it is possible that the restriction face(s) is (are) flat face(s).

As described above, the webbing take-up device according to the present invention is capable of reducing the difference in rolling sensitivities of an inertia mass body between in the rotating axial direction of an acceleration sensor with respect to a device main body, and in a direction orthogonal to the rotating axial direction.

BRIEF DESCRIPTION OF THE DRAWINGS

Embodiments of the invention will be described in detail with reference to the following figures, wherein:

FIG. 2 is an enlarged perspective view illustrating relevant portions of a webbing take-up device according to an exemplary embodiment of the present invention;

DETAILED DESCRIPTION OF THE INVENTION

Present Exemplary Embodiment Configuration

Figure 1:
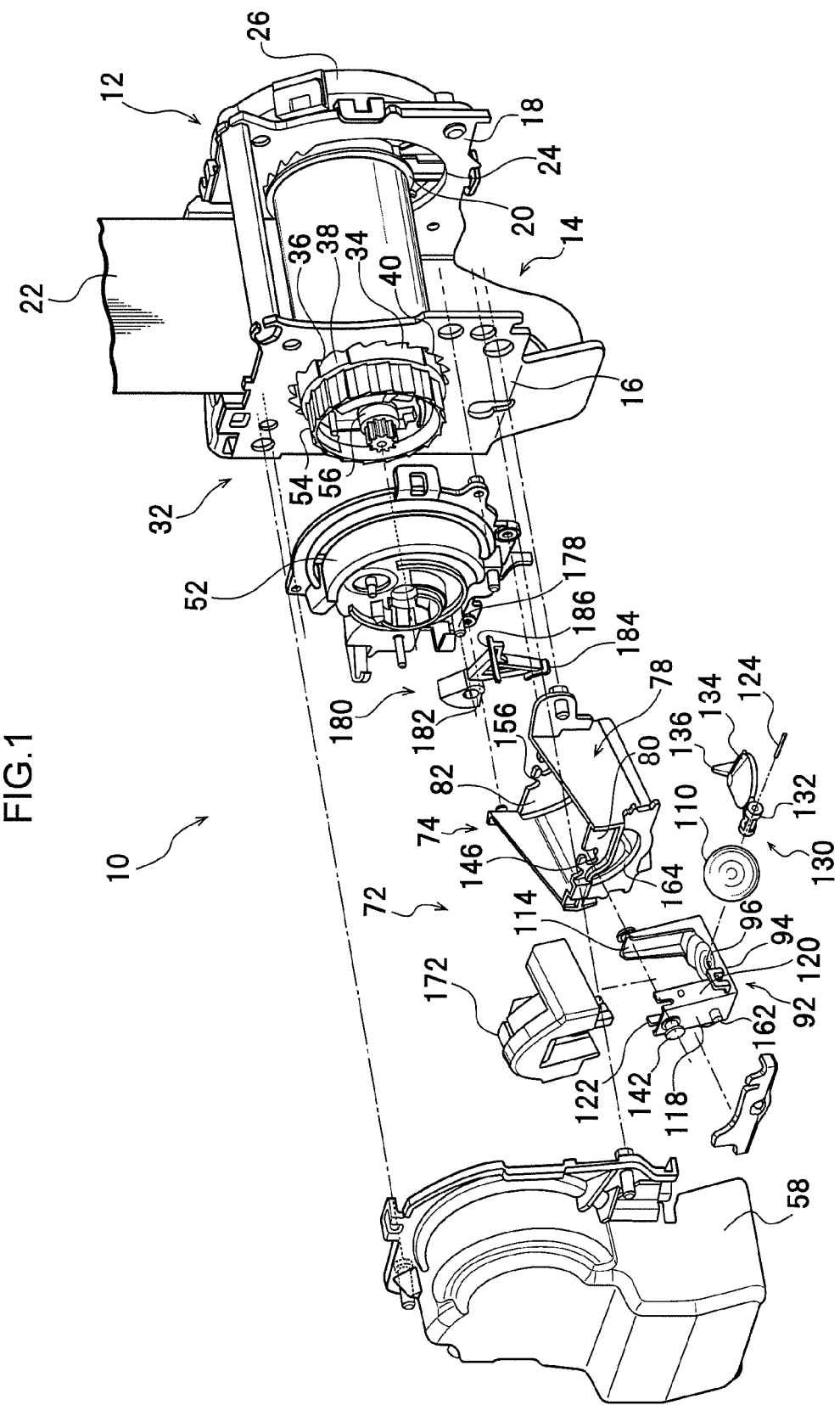
FIG. 1 is an exploded perspective view illustrating an overall configuration of a webbing take-up device according to an exemplary embodiment of the present invention.
Figure 3A:
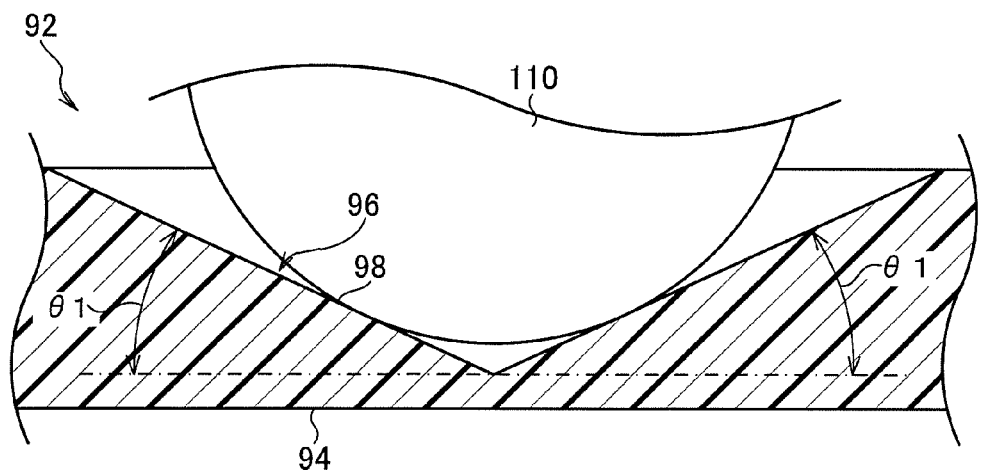
FIG. 3A is a cross-section taken along a direction orthogonal to a swing axial direction of a placement portion.
Figure 3B:
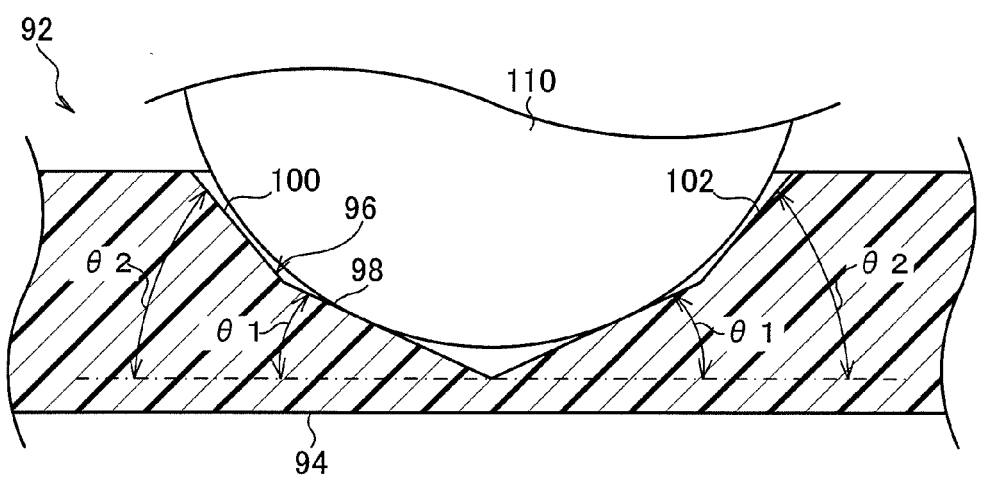
FIG. 3B is a cross-section taken along a swing axial direction of the placement portion.

FIG. 1 is a schematic exploded perspective view illustrating a schematic configuration of a webbing take-up device 10 according to an exemplary embodiment of the present invention. As illustrated in FIG. 1, the webbing take-up device 10 includes a device main body 12. The device main body 12 is provided with a frame 14. The frame 14 is provided inside a seat back configuring a vehicle seat, and is integrally fastened and fixed for example to a frame (seat back framework) of the seat back, by for example bolts.

The frame 14 includes a pair of leg plates 16 and 18. The leg plates 16 and 18 are respectively formed in plate shapes with thickness direction oriented along the seat back width direction, and face each other in the seat back width direction. A spool 20 is provided between the leg plate 16 and the leg plate 18. The spool 20 is configured as a hollow shaft member whose axial direction is oriented in the facing direction of the leg plate 16 and the leg plate 18.

A base end side in a length direction of a webbing 22 is anchored to the spool 20. The webbing 22 is formed in an elongated belt shape, with the webbing 22 width direction being along the spool 20 axial direction. The webbing 22 is taken up and stored on an outer peripheral portion of the spool 20 from the length direction base end side of the webbing 22 when the spool 20 rotates in a take-up direction that is one direction about the spool 20 axial center. When the leading end side of the webbing 22 is pulled, the webbing 22 that is taken up on the spool 20 is pulled out, and the spool 20 rotates in a pull-out direction that is the opposite direction to the take-up direction.

A spring case 26 is attached to the leg plate 18 at the outside of the leg plate 18 (on the opposite side of the leg plate 18 to the leg plate 16). A spiral spring serving as a spool biasing member is housed inside the spring case 26. A spiral direction outside end of the spiral spring is anchored to the spring case 26, and the spiral direction inside end of the spiral spring is directly or indirectly anchored to a leg plate 18 side end portion of the spool 20 that passes through the leg plate 18 and enters inside the spring case 26. When the spool 20 is rotated in the pull-out direction, the spiral spring is wound tighter and biases the spool 20 in the take-up direction.

A pawl housing portion 36 is formed to a leg plate 16 side portion of the spool 20 so to be open at the outer peripheral face of the spool 20. A lock pawl 38 is provided inside the pawl housing portion 36. The portion of the spool 20 at which the pawl housing portion 36 is formed penetrates a ratchet hole 40 formed in the leg plate 16, when a portion of the lock pawl 38 comes out from the pawl housing portion 36, a ratchet teeth formed at a leading end side of the lock pawl 38 mesh with ratchet teeth of the ratchet hole 40. Rotation of the spool 20 in the pull-out direction is accordingly restricted.

A sensor holder 52 is attached to the leg plate 16 at the leg plate 16 outside (on the opposite side of the leg plate 16 to the leg plate 18). The sensor holder 52 is formed in a bottomed shape such that a portion of the sensor holder 52 is open towards the leg plate 16 side, with a V gear 54 provided inside the sensor holder 52. A shaft portion 56 corresponding to the V gear 54 extends from the spool 20 towards the sensor holder 52 side. The shaft portion 56 is provided coaxially to the spool 20, and the V gear 54 is rotatably supported on the shaft portion 56.

The V gear 54 is provided with a spring, not shown in the drawings. A portion of this spring is engaged with the spool 20, and the spring is pressed against the spool 20 when the spool 20 rotates in the pull-out direction, and the spring pressing the V gear 54 in the pull-out direction. The V gear 54 can accordingly rotate in the pull-out direction following the spool 20. The spool 20 can rotate in the pull-out direction relative to the V gear 54 by resiliently deforming the spring. A portion of the lock pawl 38 is engaged with the V gear 54, meshes with the ratchet teeth of the ratchet hole 40 by the lock pawl 38 moving in the a direction of coming out from the pawl housing portion 36 interlockingly with the relative rotation of the spool 20 in the pull-out direction with respect to the V gear 54.

A sensor cover 58 is provided at the opposite side of the sensor holder 52 to the leg plate 16. The sensor cover 58 is configured in a bottomed shape open towards the leg plate 16 side, and is attached to the leg plate 16. An acceleration sensor 72 is provided inside the sensor cover 58. The acceleration sensor 72 includes a hanger 74. The hanger 74 is provided with a bottom wall 76, a peripheral wall 78 projects upwards from a peripheral edge of the bottom wall 76.

The hanger 74 is accordingly formed with an overall box shape open towards the side opposite to the bottom wall 76. The bottom wall 76 of the hanger 74 is fixed to the leg plate 16 of the frame 14. The bottom wall 76 of the hanger 74 is provided with support walls 80 and 82. The support wall 80 and the support wall 82 are formed in plate shapes facing each other in the same direction as the spool 20 axial direction, or facing each other in a direction in which one side along the spool 20 axial direction is inclined with respect to the other side at a specific angle in the seat up-down direction.

A sensor housing 92 serving as a housing formed for example by molding overall from a synthetic resin, is provided between the support wall 80 and the support wall 82 of the hanger 74. The sensor housing 92 is provided with a placement portion 94. In the placement portion 94, a placement face 96 is formed. The placement face 96 is open upwards in the thickness direction of the placement portion 94. The placement face 96 is provided with a general face 98. The inner peripheral shape of the general face 98 is configured to include, preferably, a circular cone shape, the general face 98 being inclined at an angle $\theta 1$ with respect to a horizontal direction of the placement face 96.

The placement face 96 is also provided with a pair of restriction faces 100 and 102. The restriction face 100 is formed inside the placement face 96 at a location further towards the support wall 80 side than a center of the placement face 96. The restriction face 102 is formed inside the placement face 96 at a location further towards the support wall 82 side than the center of the placement face 96. As described above, the inner peripheral face of the general face 98 is a circular cone shape, so the inner peripheral face of the general face 98 is curved such that the axial center of the circular cone is as the center of curvature.

On the other hand, the restriction faces 100 and 102 are configured as flat (plane) faces inclined towards the axial center side with respect to the opening side of the placement face 96. The restriction face 100 moreover forms an angle $\theta 2$ with respect to the horizontal direction of the placement face 96 that is set larger than the angle $\theta 1$. The restriction face 102 forms an angle $\theta 3$ with respect to the horizontal direction of the placement face 96 that is also set larger than the angle $\theta 1$. In the present exemplary embodiment, the angle $\theta 2$ and the angle $\theta 3$ are set the same as each other.

A sensor ball 110 serving as an inertia mass body is placed on the placement face 96. An external diameter dimension of the sensor ball 110 and a range (location) for forming the restriction faces 100 and 102 are set such that the outer peripheral face of the sensor ball 110 makes contact with the general face 98 (in the present exemplary embodiment, only the general face 98) at a lower side than the restriction faces 100 and 102 in a state in which the center of the sensor ball 110 is on (is aligned with) the axial center of the circular cone (the inner peripheral face of the general face 98) described above.

A vertical wall 114 projects upwards from a support wall 82 side end portion of the placement portion 94, and a vertical wall 118 projects upwards from a support wall 80 side end portion of the placement portion 94. Lateral walls 120 and 122 extend from both width direction ends of the vertical wall 118 towards the vertical wall 114 side. A support shaft 124 is provided in the vicinity of upper end portions of the lateral walls 120 and 122. As illustrated in FIG. 1, the support shaft 124 is a shaft member whose axial direction is along the facing direction of the lateral wall 120 and the lateral wall 122. One end of the support shaft 124 is supported by the lateral wall 120 and the other end of the support shaft 124 is supported by the lateral wall 122.

A sensor lever 130 is provided between the lateral wall 120 and the lateral wall 122. As illustrated in FIG. 1, the sensor lever 130 includes a base portion 132. In the base portion 132, the support shaft 124 penetrates through. The sensor lever 130 is accordingly supported so as to be capable of rotating (swinging) about the support shaft 124. The sensor lever 130 includes a hat portion 134. The hat portion 134 is formed with a shallow circular conical shaped external appearance. The bottom face of the hat portion 134 is configured as a curved face or a sloping face with a concave shape that is open towards the opposite side to the circular cone apex portion of the hat portion 134. The bottom face of the hat portion 134 covers the sensor ball 110 that is placed on the placement face 96 of the placement portion 94.

The hat portion 134 rotates (swings) upwards about the support shaft 124 when the sensor ball 110 rises up on the placement face 96 towards an edge portion of the placement face 96. A pressing projection 136 is formed to the hat portion 134, so as to project substantially upwards (namely towards the opposite side to the bottom face of the hat portion 134), and the pressing projection 136 pushes upwards a V pawl 180, described later, when the hat portion 134 swings upwards about the support shaft 124.

A rotating shaft 142 is provided in the vicinity of an upper end portion of the vertical wall 118 described above, and is formed projecting from the face of the vertical wall 118 on the opposite side to the vertical wall 114. A shaft receiving groove 146 is formed to the support wall 80 of the hanger 74, corresponding to the rotating shaft 142. The shaft receiving groove 146 penetrates the support wall 80 in the thickness direction and is open at an upper end portion of the support wall 80. The shaft receiving groove 146 is bent or curved into a substantially L-shape at an intermediate portion of the shaft receiving groove 146. The rotating shaft 142, that enters inside the shaft receiving groove 146 from the open end of the shaft receiving groove 146 at the upper end portion of the support wall 80, reaches the end portion of the shaft receiving groove 146 on the opposite side to the open end. A shaft portion 144 (the rotating shaft 142) is supported by the shaft receiving groove 146 so as to be capable of rotating (swinging) about its axial center.

A rotating shaft 152 is provided in the vicinity of an upper end portion of the vertical wall 114 described above, and is formed projecting from the face of the vertical wall 114 on the opposite side to the vertical wall 118. A shaft receiving groove 156 is formed to the support wall 82 of the hanger 74, corresponding to the rotating shaft 152. The shaft receiving groove 156 penetrates the support wall 82 in the thickness direction and is open at an upper end portion of the support wall 82. The shaft receiving groove 156 is bent or curved into a substantially L-shape as viewed along the support wall 82 thickness direction. The rotating shaft 152, that enters inside the shaft receiving groove 156 from the open end of the shaft receiving groove 156 at the upper end portion of the support wall 82, reaches the end portion of the shaft receiving groove 156 on the opposite side to the open end. A shaft portion 154 (the rotating shaft 152) is supported by the shaft receiving groove 156 so as to be capable of rotating (swinging) about its axial center.

A guide pin 162 is formed projecting from the face of the vertical wall 118 on the opposite side to the vertical wall 114 at the lower side of the position where the rotating shaft 142 is formed to the vertical wall 118. The projection direction of the guide pin 162 from the vertical wall 118 is the same direction as the axial direction of the shaft portion 144 of the rotating shaft 142. The guide pin 162 enters inside a guide hole 164 formed in the support wall 80 of the hanger 74.

The guide hole 164 is configured as a curved elongated hole with curvature thereof centered on a specific position of the shaft receiving groove 146. The guide pin 162 enters inside the guide hole 164, thereby limiting the rotating (swinging) range of the sensor housing 92 about the rotating shaft 142 to between a position where the guide pin 162 abuts one length direction end of the guide hole 164 and a position where the guide pin 162 abuts the other length direction end of the guide hole 164.

A support shaft 178 is formed projecting from the sensor holder 52 towards the opposite side to the leg plate 16. The support shaft 178 axial direction is set as the same direction as the spool 20 axial direction, and a base portion 182 of the V pawl 180 is supported so as to be capable of rotating about the support shaft 178. The V pawl 180 is provided with a plate shaped pressure receiving plate 184. The pressure receiving plate 184 is positioned at the upper side of the pressing projection 136 of the sensor lever 130. The pressing projection 136 is set with a size such that, within the rotating range of the sensor housing 92 about the rotating shaft 142 between the abut state of the guide pin 162 with the one end of the guide hole 164 and the abut state of the guide pin 162 with the other end of the guide hole 164, the lower side face of the pressure receiving plate 184 faces the pressing projection 136.

The V pawl 180 is further provided with an engagement claw 186. An opening, not shown in the drawings, is formed at the sensor holder 52, corresponding to the engagement claw 186. A portion of the sensor holder 52 that houses the V gear 54 and the outside of the sensor holder 52 are in communication with each other through this opening. When the sensor lever 130 rotates upwards about the support shaft 124 and the pressing projection 136 presses the pressure receiving plate 184 upwards, the engagement claw 186 meshes with ratchet teeth formed to an outer peripheral portion of the V gear 54. Rotation of the V gear 54 in the pull-out direction is thereby restricted when the engagement claw 186 is meshed with the ratchet teeth of the V gear 54.

Operation and Advantageous Effects of Present Exemplary Embodiment

Explanation now follows regarding operation and advantageous effects of the present exemplary embodiment.

In the webbing take-up device 10, in event of sudden vehicle deceleration, the sensor ball 110 rolls across the placement face 96 formed at the placement portion 94 of the sensor housing 92 in the acceleration sensor 72, the sensor ball 110 rising up as it rolls towards an edge portion side of the placement face 96. The sensor ball 110 that has rolled as described above presses the bottom face of the hat portion 134 upwards, rotating the sensor lever 130 upwards about the support shaft 124.

The pressing projection 136 formed at the hat portion 134 pushes up the lower face of the pressure receiving plate 184 of the V pawl 180 when the sensor lever 130 rotates in this manner, thereby rotating (swinging) the V pawl 180 about the support shaft 178. When the V pawl 180 rotates in this manner, the engagement claw 186 accordingly moves upwards, meshing with the ratchet teeth formed to the outer peripheral portion of the V gear 54. Rotation of the V gear 54 in the pull-out direction is accordingly restricted.

The webbing 22 is pulled when the occupant wearing the webbing 22 moves under inertia towards the vehicle front due to sudden vehicle deceleration. The spool 20 rotates in the pull-out direction as the webbing 22 is pulled.

When the spool 20 rotates in the pull-out direction in a state in which relative rotation of the V gear 54 in the pull-out direction is restricted due to the engagement claw 186 of the V pawl 180 meshing with the ratchet teeth of the V gear 54, as described above, relative rotation of the spool 20 in the pull-out direction with respect to the V gear 54 occurs. When such relative rotation occurs between the V gear 54 and the spool 20, the lock pawl 38 moves such that a portion of the lock pawl 38 projects out from the pawl housing portion 36 that is formed at the spool 20, and ratchet teeth at the leading end side of the lock pawl 38 thereby meshes with the ratchet teeth of the ratchet hole 40 formed at the leg plate 16.

Rotation of the spool 20 in the pull-out direction is thus restricted due to the ratchet teeth of the lock pawl 38 meshing with the ratchet teeth of the ratchet hole 40. The webbing 22 is thereby restricted from being pulled out from the spool 20, the webbing 22 thereby effectively restraining the body of the occupant as it attempts to move under inertia towards the vehicle front.

Note that the webbing take-up device 10 is built into the seat back of the seat with reclining mechanism, as described above. When the seat back is reclined with respect to a seat cushion, the webbing take-up device 10 that is built into the seat back rotates (swings) about the reclining axis of the seat back and tilts.

In the webbing take-up device 10, the rotating shafts 142 and 152 of the sensor housing 92 of the acceleration sensor 72 are supported by the support walls 80 and 82 of the hanger 74 so as to be capable of rotating. The device main body 12 of the webbing take-up device 10 tilts together with the seat back, however the sensor housing 92 of the acceleration sensor 72 rotates relative to the hanger 74 (namely the device main body 12) as the sensor housing 92 attempts to maintain the same attitude as the attitude in a state prior to the device main body 12 reclining.

Figure 4:
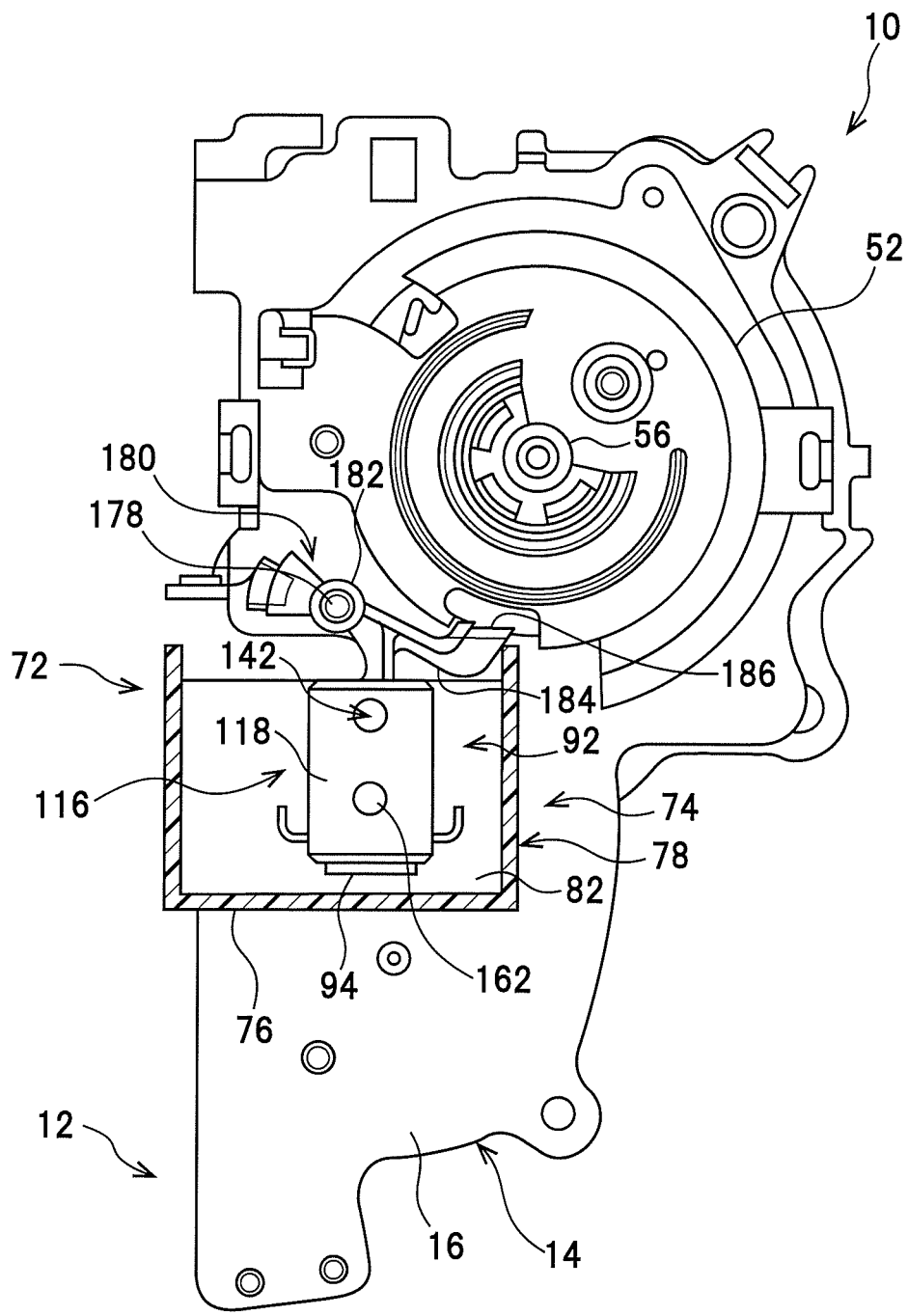
FIG. 4 is a side view illustrating a state of a device main body prior to tilting.
Figure 5:
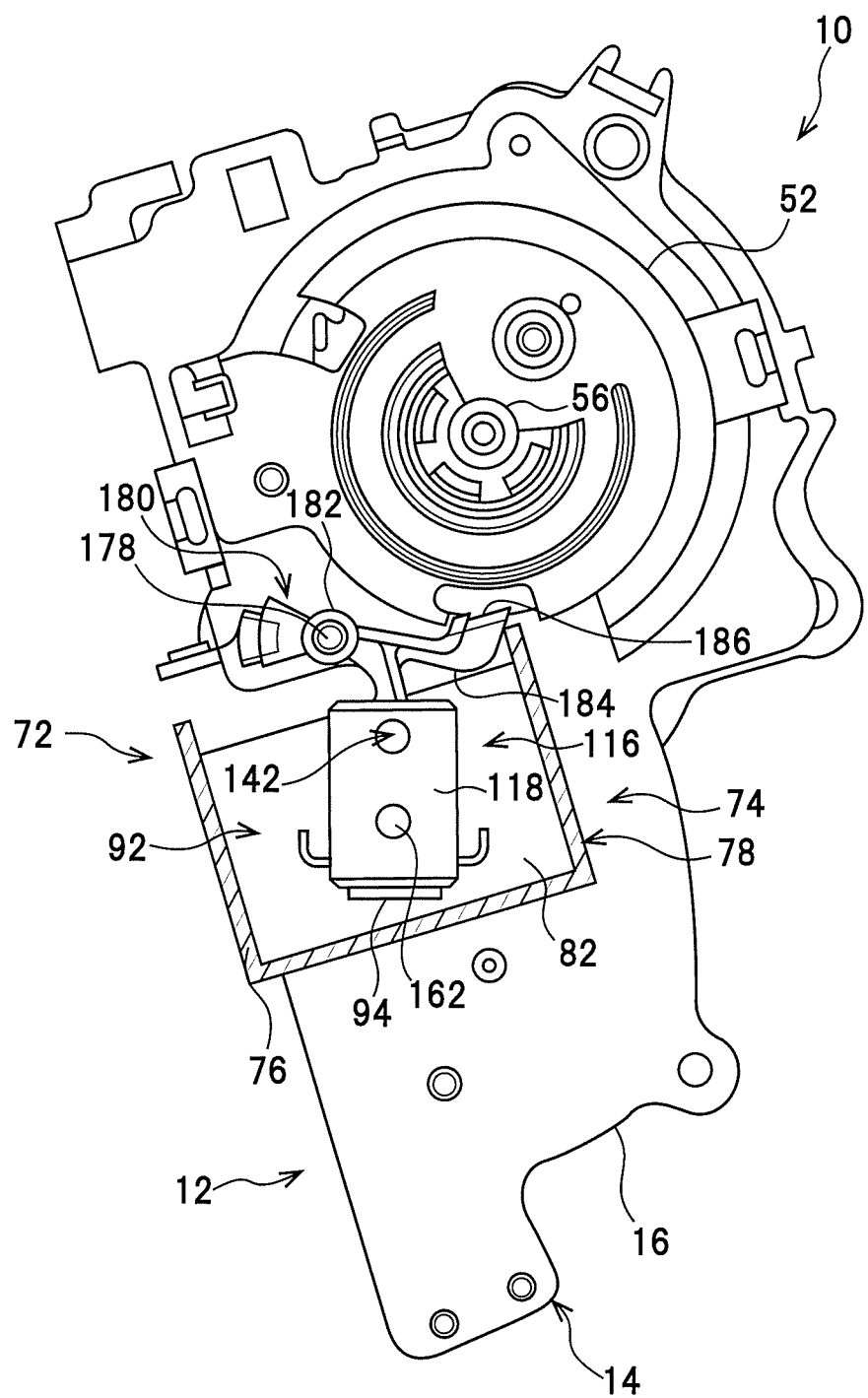
FIG. 5 is a side view illustrating a tilted state of a device main body.

Accordingly, even when the device main body 12 tilts, from a state illustrated in FIG. 4, as illustrated in FIG. 5, the attitude (orientation) of the sensor housing 92 of the acceleration sensor 72 does not change, with the opening direction of the placement face 96 being maintained to direct upwards. Accordingly, even when the device main body 12 is tilted, there is no change to the function of the acceleration sensor 72, and as described above, the sensor ball 110 can be made to roll over the placement face 96 even in the event of sudden vehicle deceleration, enabling actuation of the lock mechanism 32.

In the present exemplary embodiment, in the placement face 96 in which the general face 98 having circular cone shape is formed, the restriction faces 100 and 102 are formed. The sensor ball 110 accordingly abuts the restriction face 100 or the restriction face 102 when the sensor ball 110 rolls along the axial direction of the rotating shafts 142 and 152. From this state, in order for the sensor ball 110 to roll further along the axial direction of the rotating shafts 142 and 152, the sensor ball 110 has to rise up the restriction face 100 or the restriction face 102 that respectively have a larger angle of incline than angle of incline of the general face 98.

On the other hand, in order for the sensor ball 110 to roll along the direction orthogonal to the axial direction of the rotating shafts 142 and 152 as seen in plan view, the sensor ball 110 only has to roll over the general face 98.

For example at the time of sudden vehicle deceleration, the sensor housing 92 rotates (swings) about the rotating shafts 142 and 152 under inertia. In this case, the sensor ball 110 accordingly rolls less readily along the direction orthogonal to the rotating shafts 142 and 152 as seen in plan view. However, the sensor ball 110 rolls readily along the axial direction of the rotating shafts 142 and 152 even in this case, since the sensor housing 92 does not rotate (swing) towards the axial direction of the rotating shafts 142 and 152.

As explained above, the present exemplary embodiment is therefore configured with a structure such that the sensor ball 110 less readily rolls along the axial direction of the rotating shafts 142 and 152. The difference of the eases of rolling (the rolling sensitivities) of the sensor ball 110 between in the direction orthogonal to the axial direction of the rotating shafts 142 and 152 and in the axial direction of the rotating shafts 142 and 152 as seen in plan view, can accordingly be made smaller in the case in which the sensor housing 92 rotates about the rotating shafts 142 and 152 under inertia when sudden vehicle deceleration as described above.

Moreover, in a state prior to the sensor ball 110 rolling, the sensor ball 110 is positioned on the general face 98. Since the general face 98 has a circular conical shape, the contact portion between the sensor ball 110 and the general face 98 forms a circular ring shape. The sensor ball 110 can accordingly be stabilized in a normal state.

Note that in the present exemplary embodiment, the restriction faces 100 and 102 are configured as flat faces, the restriction faces 100 and 102 may be configured as curved faces. However, when considering the ease of molding the sensor housing 92 including the placement face 96, flat faces for the restriction face 100 and the restriction face 102 have the advantage of being easier to mold.

What is claimed is:

1. A webbing take-up device comprising:

a device main body comprising a spool, the spool taking up a webbing from a base end side thereof in a webbing length direction onto an outer peripheral portion of the spool by rotating in a take-up direction that is one direction about a center axis of the spool;

an acceleration detection section that is provided at the device main body so as to be capable of rotating with respect to the device main body about an axis whose axial direction is a specific direction such that, accompanying tilting of the device main body, the acceleration detection section maintains the same orientation as orientation of the acceleration detection section in a state prior to the device main body tilting, a placement face, formed in a concave shape that is open upwards, being formed at the acceleration detection section, a spherical shaped inertia mass body being placed on the placement face, the inertia mass body rolling on the placement face due to inertia at a time of a sudden vehicle deceleration, the placement face being configured to include a general face and a restriction face, the general face being a shape that an inner peripheral profile is open upwards, the restriction face being formed on only on opposing sides of the placement face and further than a center of the placement face in a vehicle left-right direction as seen in plan view from an open direction side of the placement face, an angle of incline, with respect to a horizontal direction, of the restriction face being larger than an angle of incline, with respect to the horizontal direction, of the general face, and the smaller angle of incline of the general face being continuous between the opposing restriction faces such that rolling of the inertia mass body on the placement face in the vehicle left-right direction is restricted to a greater extent than rolling of the inertia mass body on the placement face in a vehicle front-rear direction; and a lock section that is actuated by the spool rotating in a pull-out direction that is the opposite direction from the take-up direction in a state in which the inertia mass body of the acceleration detection section rolls on the placement face, rotation of the spool in the pull-out direction being restricted by actuation of the lock section, wherein the general face has a circular cone shape such that the general face is formed in the vehicle front-rear direction and in the vehicle left-right direction at the placement face as seen in the plan view from an open direction side of the placement face, and wherein at the placement face, in the vehicle left-right direction, the general face is formed at a side of the center of the placement face with respect to the restriction face such that in a state in which the inertia mass body is on the center of the placement face, the inertia mass body does not contact the restriction face, and the inertia mass body circularly contacts the general face in the vehicle front-rear direction and the vehicle left-right direction.

2. The webbing take-up device of claim 1, wherein: the restriction faces are formed on both sides further than the center of the placement face in the vehicle left-right direction as seen in the plan view; the restriction faces are configured as faces that are inclined towards the center side of the placement face as seen in the plan view from the open side of the placement face; and the restriction faces are set such that, in a state in which the inertia mass body is placed at the center of the placement face as seen in the plan view, the inertia mass body contacts the general face at a lower side than the restriction faces.

3. The webbing take-up device of claim 1, wherein the restriction face is a flat face.

4. The webbing take-up device of claim 2, wherein the restriction faces are flat faces.

* * * * *